United States Patent
Jin et al.

(10) Patent No.: US 11,256,758 B2
(45) Date of Patent: Feb. 22, 2022

(54) SYSTEM AND METHOD FOR RENDERING OVERLAPPING POINTS

(71) Applicant: SAP SE, Walldorf (DE)

(72) Inventors: Xing Jin, Vancouver (CA); Xin Qiu, Vancouver (CA); James Lloyd, Vancouver (CA)

(73) Assignee: SAP SE, Walldorf (DE)

(*) Notice: Subject to any disclaimer, the term of this patent is extended or adjusted under 35 U.S.C. 154(b) by 216 days.

(21) Appl. No.: 16/054,816

(22) Filed: Aug. 3, 2018

(65) Prior Publication Data

US 2020/0042653 A1  Feb. 6, 2020

(51) Int. Cl.
*G06F 3/0482* (2013.01)
*G06F 16/904* (2019.01)
*G06F 17/18* (2006.01)
*G06T 11/20* (2006.01)
*G01C 21/32* (2006.01)
*G06T 11/00* (2006.01)
*G06F 16/29* (2019.01)

(52) U.S. Cl.
CPC .......... *G06F 16/904* (2019.01); *G01C 21/32* (2013.01); *G06F 3/0482* (2013.01); *G06F 16/29* (2019.01); *G06F 17/18* (2013.01); *G06T 11/001* (2013.01); *G06T 11/20* (2013.01)

(58) Field of Classification Search
CPC ........ G06F 3/0482; G06F 17/30; G06F 17/18; G06T 11/001; G06T 11/20; G01C 21/32
See application file for complete search history.

(56) References Cited

U.S. PATENT DOCUMENTS

| | | | |
|---|---|---|---|
| 2009/0132469 A1* | 5/2009 | White | G06Q 10/00 |
| 2010/0057275 A1* | 3/2010 | Schilke | G01W 1/00 701/14 |
| 2013/0194258 A1* | 8/2013 | Lin | G09G 5/14 345/419 |

* cited by examiner

*Primary Examiner* — Andrea C Leggett
(74) *Attorney, Agent, or Firm* — Fountainhead Law Group P.C.

(57) ABSTRACT

Some embodiments provide a non-transitory machine-readable medium that stores a program. The program receives from a computing system a plurality of data and a plurality of points associated with the plurality of data for display in a view of a map. Each point in the set of points includes location data specifying a location of the point. The program further determines that a subset of the plurality of points have the same location data. The program also renders in the view of the map a geometry representing the subset of the plurality of points and an indication that the geometry represents the subset of the plurality of points. For points in the plurality of points other than the subset of the plurality of points, the program further renders geometries that represent the points.

20 Claims, 9 Drawing Sheets

200

| Store ID | Location | Geo ID | Expenses ($k) | Income ($k) | |
|---|---|---|---|---|---|
| 105 | (37, -121) | 1 | 18.7 | 42.1 | 230 |
| 67 | (34, -118) | 2 | 8.3 | 25.8 | 232 |
| 657 | (37, -121) | 3 | 14.6 | 37.3 | 234 |
| 111 | (33, -80) | 4 | 6.5 | 10.1 | 236 |
| 137 | (29, -95) | 5 | 4.3 | 13.3 | 238 |
| 257 | (52, -92) | 6 | 2.5 | 9.7 | 240 |
| 104 | (49, -123) | 7 | 9.6 | 20.1 | 242 |
| 84 | (59, 11) | 8 | 5.9 | 13.3 | 244 |
| 2 | (-5, -102) | 9 | 3.1 | 16.1 | 246 |
| 489 | (37, -121) | 10 | 12.3 | 17.8 | 248 |
| 93 | (37, -121) | 11 | 9.5 | 33.6 | 250 |
| 834 | (40, -111) | 12 | 11.4 | 19.8 | 252 |

| Location | Geo ID | |
|---|---|---|
| (37, -121) | 1, 3, 10, 11 | 312 |
| (34, -118) | 2 | 314 |
| (29, -95) | 5 | 316 |
| (49, -123) | 7 | 318 |
| (40, -111) | 12 | 320 |

FIG. 3

SYSTEM AND METHOD FOR RENDERING OVERLAPPING POINTS

BACKGROUND

Maps and mapping technology are used in many current computing and mobile applications and services. For example, some applications or services utilize mapping technology to provide navigation functions, location functions, traffic congestion functions, etc. Other applications or services may employ mapping technology to provide location-based search functions, social-networking functions, ride-sharing services, etc. In addition, some applications or services can use maps to present data that has a geographical component associated with it.

SUMMARY

In some embodiments, non-transitory machine-readable medium stores a program. The program receives from a computing system a plurality of data and a plurality of points associated with the plurality of data for display in a view of a map. Each point in the set of points includes location data specifying a location of the point. The program further determines that a subset of the plurality of points have the same location data. The program also renders in the view of the map a geometry representing the subset of the plurality of points and an indication that the geometry represents the subset of the plurality of points. For points in the plurality of points other than the subset of the plurality of points, the program further renders geometries that represent the points.

In some embodiments, the program may further receive from the computing system a plurality of point identifiers associated with the plurality of points. Determining the subset of the plurality of points may include, for each point in the plurality of points, determining whether the location data of the point exists in a mapping of location data and point identifiers; adding the point identifier to point identifiers mapped to the location data when the location data of the point is determined to exist in the mapping; and adding an association between the location data and the point identifier to the mapping when the location data of the point is determined to exist in the mapping In some embodiments, the program may also receive a selection of the geometry representing the subset of the plurality of points, and, in response to receiving the selection, provide a user interface control that includes a selectable UI element for each point in the subset of the plurality of points. The program may further receive a selection of one of the selectable UI elements in the user interface control; receive a request for a visualization of the data associated with the point associated with the selected UI element; and, in response to the request, provide the visualization of the data associated with the point associated with the selected UI element.

In some embodiments, the program may also calculate an average value based on the data associated with the subset of the plurality of points; determine a size of the geometry representing the subset of the plurality of points based on the average value; and, for points in the plurality of points other than the subset of the plurality of points, determine sizes for the geometries based on values of the data associated with the points. In some embodiments, the program may further determine a color value for each point in the plurality of points based on values of the data associated with the plurality of points and a set of threshold values; calculate an average color value based on the determined color values of the subset of the plurality of points based on the average value; determine a color of the geometry representing the subset of the plurality of points based on the average color value; and, for points in the plurality of points other than the subset of the plurality of points, determine colors for the geometries based on the color values of the points.

In some embodiments, the program may also receive a request for view of the map; determine a map extent of the view of the map; generate a query for points with location data that fall within the map extent; and send the query to the computing system. The plurality of data and the plurality of points associated with the plurality of data received from the computing system may be a response to the query.

In some embodiments, a method receives from a computing system a plurality of data and a plurality of points associated with the plurality of data for display in a view of a map. Each point in the set of points includes location data specifying a location of the point. The method further determines that a subset of the plurality of points have the same location data. The method also renders in the view of the map a geometry representing the subset of the plurality of points and an indication that the geometry represents the subset of the plurality of points. For points in the plurality of points other than the subset of the plurality of points, the method further renders geometries that represent the points.

In some embodiments, the method may further receive from the computing system a plurality of point identifiers associated with the plurality of points. Determining the subset of the plurality of points may include, for each point in the plurality of points, determining whether the location data of the point exists in a mapping of location data and point identifiers; adding the point identifier to point identifiers mapped to the location data when the location data of the point is determined to exist in the mapping; and adding an association between the location data and the point identifier to the mapping when the location data of the point is determined to exist in the mapping.

In some embodiments, the method may also receive a selection of the geometry representing the subset of the plurality of points, and, in response to receiving the selection, provide a user interface control that includes a selectable UI element for each point in the subset of the plurality of points. The method may further comprising receive a selection of one of the selectable UI elements in the user interface control; receive a request for a visualization of the data associated with the point associated with the selected UI element; and, in response to the request, provide the visualization of the data associated with the point associated with the selected UI element.

In some embodiments, the method may further calculate an average value based on the data associated with the subset of the plurality of points; determine a size of the geometry representing the subset of the plurality of points based on the average value; and, for points in the plurality of points other than the subset of the plurality of points, determine sizes for the geometries based on values of the data associated with the points. In some embodiments, the method may also determine a color value for each point in the plurality of points based on values of the data associated with the plurality of points and a set of threshold values; calculate an average color value based on the determined color values of the subset of the plurality of points based on the average value; determine a color of the geometry representing the subset of the plurality of points based on the average color value; and, for points in the plurality of points other than the subset of the plurality of points, determine colors for the geometries based on the color values of the points.

In some embodiments, the method may further receive a request for view of the map; determine a map extent of the view of the map; generate a query for points with location data that fall within the map extent; and send the query to the computing system. The plurality of data and the plurality of points associated with the plurality of data received from the computing system may be a response to the query.

In some embodiments, a system includes a set of processing units and a non-transitory machine-readable medium that stores instructions. The instructions cause at least one processing unit to receive from a computing system a plurality of data and a plurality of points associated with the plurality of data for display in a view of a map. Each point in the set of points includes location data specifying a location of the point. The instructions further cause the at least one processing unit to determine that a subset of the plurality of points have the same location data. The instructions also cause the at least one processing unit to render in the view of the map a geometry representing the subset of the plurality of points and an indication that the geometry represents the subset of the plurality of points. For points in the plurality of points other than the subset of the plurality of points, the instructions further cause the at least one processing unit to render geometries that represent the points.

In some embodiments, the instructions may further cause the at least one processing unit to receive from the computing system a plurality of point identifiers associated with the plurality of points. Determining the subset of the plurality of points may include, for each point in the plurality of points, determining whether the location data of the point exists in a mapping of location data and point identifiers; adding the point identifier to point identifiers mapped to the location data when the location data of the point is determined to exist in the mapping; and adding an association between the location data and the point identifier to the mapping when the location data of the point is determined to exist in the mapping.

In some embodiments, the instructions may also cause the at least one processing unit to receive a selection of the geometry representing the subset of the plurality of points, and in response to receiving the selection, provide a user interface control that includes a selectable UI element for each point in the subset of the plurality of points. The instructions may further cause the at least one processing unit to receive a selection of one of the selectable UI elements in the user interface control; receive a request for a visualization of the data associated with the point associated with the selected UI element; and, in response to the request, provide the visualization of the data associated with the point associated with the selected UI element.

In some embodiments, the instructions may also cause the at least one processing unit to calculate an average value based on the data associated with the subset of the plurality of points; determine a size of the geometry representing the subset of the plurality of points based on the average value; and, for points in the plurality of points other than the subset of the plurality of points, determine sizes for the geometries based on values of the data associated with the points. The instructions may further cause the at least one processing unit to determine a color value for each point in the plurality of points based on values of the data associated with the plurality of points and a set of threshold values; calculate an average color value based on the determined color values of the subset of the plurality of points based on the average value; determine a color of the geometry representing the subset of the plurality of points based on the average color value; and, for points in the plurality of points other than the subset of the plurality of points, determine colors for the geometries based on the color values of the points.

The following detailed description and accompanying drawings provide a better understanding of the nature and advantages of the present invention.

BRIEF DESCRIPTION OF THE DRAWINGS

FIG. 2 illustrates an example table of data according to some embodiments.

FIG. 3 illustrates an example mapping of coordinates and geographical identifiers according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for rendering overlapping points. In some embodiments, a system includes a client device and a computing system. The client device may request data for rendering on a map from the computing system. The data can include points and coordinates associated with the points. When the client device receives the requested data, the client device determines that the coordinates associated with several of the points are the same. The client device renders a geometry that represents the several points that have the same coordinates and an indication that the geometry represents several points. For other points that have different coordinates, the client device renders individual geometries for each such points.

The techniques described in the present application provide a number of benefits and advantages over conventional methods for rendering data on maps. First, rendering points that have the same coordinates using a single geometry and an indication that the geometry represents multiple points improves the presentation of such data because conventional methods just render points with the same coordinates on top of each other. Second, providing UI controls that allow a user to view and interact with the different data associated with overlapping points is an improvement upon conventional methods that only allow a user to view or interact with the top-most point.

Figure 1:
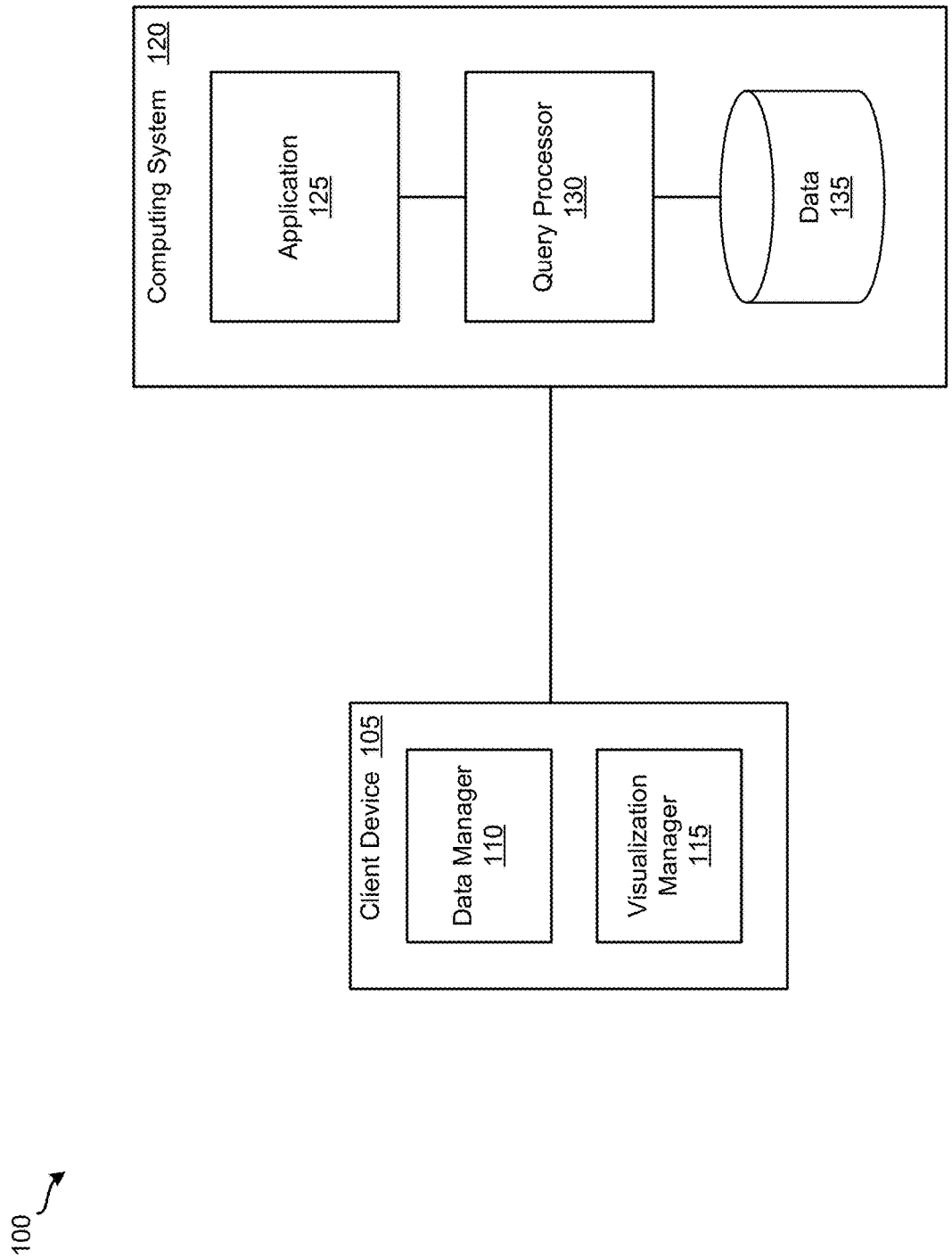
FIG. 1 illustrates a system for handling overlapping points according to some embodiments.

FIG. 1 illustrates a system 100 for handling overlapping points according to some embodiments. As shown, system 100 includes client device 105 and computer system 120. While FIG. 1 shows one client device 105, one of ordinary skill in the art will appreciate that any number of additional client devices configured similarly to client device 105 may be included in system 100.

As illustrated in FIG. 1, client device 105 includes data manager 110 and visualization manager 115. Data manager 110 is configured to manage data for visualizations. For instance, a user of client device 105 may request a view of a map with data that includes non-location data and location data associated with the non-location data. In some embodiments, non-location data may include quantitative (e.g., numeric) data and/or qualitative data. Quantitative data can be measures while qualitative data can be dimensions used for categorizing the measures. In some embodiments, location data can include address data, city data, state data, country data, postal zip code data, latitude and longitude data, etc., or a combination of any number of different types of location data (e.g., address data and city data, city data and state data, address data, etc.). In response to the request, data manager 110 can determine a map extent for the view of the map. In some embodiments, a map extent is a defined region of a map. Next, data manager 110 generates a query for non-location data that has associated location data that falls within the map extent and sends the query to computing system 120. When data manager 110 receives the requested data from computing system 120, data manager 110 processes the data to determine overlapping points in the data. Data manager 110 then sends visualization manager 115 the map extent, the requested data, and the determined overlapping points.

Visualization manager 115 is responsible for rendering views of maps. For example, visualization manager 115 may receive from data manager 110 a map extent, data, and determined overlapping points in the data. In response, visualization manager 115 renders a view of a map defined by the map extent. In some embodiments, visualization manager 115 renders a view of a map defined by a map extent by retrieving map data (e.g., raster tiles, vector base maps, etc.) for the view of the map defined by the map extent from another computing system (e.g., a third party system that provides map data) and rendering the view of the map based on the map data. In addition, visualization manager 115 renders a geometry in the view of the map that represents the overlapping points. The location of the geometry is based on the common location data associated with the overlapping points. Visualization manager 115 also renders an indication that the geometry represents the overlapping points. For points in the data that are not overlapping, visualization manager 115 renders a geometry for each point based on the location data associated with the point. After rendering is complete, visualization manager 115 provides the view of the map (e.g., on a display of client device 105) for viewing.

As shown in FIG. 1, computing system 120 includes application 125, query processor 130, and data storage 135. Data storage 135 is configured to store data that includes non-location data and location data associated with the non-location data. In some embodiments, data storage 13 is implemented in a single physical storage while, in other embodiments, data storage 135 may be implemented across several physical storages. While FIG. 1 shows data storage 135 as part of computing system 120, one of ordinary skill in the art will appreciate that data storage 135 may be external to computing system 120 in some embodiments.

Application 125 communicates and interacts with client device 105. For example, application 125 may receive from client device 105 a query for non-location data that has associated location data that falls within a map extent. In response, application 125 forwards the query to query processor 130 for processing. When application 125 receives the results of the query from query processor 130, application 125 sends it to client device 105. Application 125 may be any number of different types of applications. For instance, application 125 may be an analytics application, a data management application, a database management application, a human capital management application, an enterprise management application, a customer relationship management application, a financial management application, etc.

Query processor 130 is configured to process queries for data stored in data storage 135. For instance, query processor 130 can receive from application 125 a query for non-location data that has associated location data that falls within a map extent. To process such a query, query process 130 accesses data storage 135 to identify the requested data and retrieves the requested data. In some embodiments, query processor 135 identifies the requested data by performing spatial operations on the data and the map extent to identify the non-location data that has associated location data that falls within the map extent. Query processor 130 then sends requested data to application 125.

An example operations of system 100 will now be described by reference to FIGS. 1-6. FIG. 2 illustrates an example table 200 of data according to some embodiments. Specifically, table 200 will be used as the data stored in database 135 for this example. As shown, table 200 includes twelve records of data 230-252. Each of the records 230-252 is divided into fields 205-225. In this example, fields 205 and 215-225 are configured to store non-location data while field 210 is configured to store location data. Field 205 is configured to store a unique identifier associated with a store. Field 210 is configured to store location data associated with a store. In this example, the location data is latitude and longitude coordinates that specify a point representing the geographical location of a store. Field 215 is configured to store a geographical identifier (ID) for uniquely identifying the location data associated with a store. Field 220 is configured to store a value that represents expenses incurred by a store in terms of thousands of dollars ($k). Field 225 is configured to store a value that represents income generated by a store in terms of thousands of dollars ($k).

The example operation starts by a user of client device 105 interacting with application 125 and requesting a view of a map showing locations of stores based on expense data of the stores. When client device 105 receives the request from the user, data manager 110 determine a map extent for the view of the map. In this example, data manager 110 determines that the map extent of the view of the map specifies a latitude range of 25-50 and a longitude range of (−125)-(−90). Data manager 10 then generates a query for records in table 200 having coordinates in field 210 that falls within the map extent. Next, data manager 110 sends the query to application 125. When application 125 receives the query from client device 105, application 125 forwards the query to query processor 130 for processing.

Upon receiving the query, query processor 130 processes the query by performing spatial operations on records 230-252 in table 200 and the map extent to identify the records 230-252 that have coordinates in field 210 that fall within the map extent. For this example, query processor 130 identifies records 230-234, 238, 242, and 248-252 as records having coordinates in field 210 that fall within the map extent. Query processor 130 sends these records to application 125, which forwards them to data manager 110.

Once data manager 110 receives records 230-234, 238, 242, and 248-252 from application 125, data manager 110 determines records that have overlapping points. In this example, data manager 110 determines records that have overlapping points by iterating through each of the records 230-234, 238, 242, and 248-252 and determining whether the coordinates of each point exists in a mapping of coordinates and geographical IDs. If the coordinates of a point is in the mapping, data manager 110 adds the geographical ID of the point to the other geographical IDs mapped to the coordinates in the mapping. If the coordinates of a point is not in the mapping, data manager 110 adds an association between the coordinates of the point and the geographical ID of the point to the mapping.

FIG. 3 illustrates an example mapping 300 of coordinates and geographical identifiers according to some embodiments. In particular, for this example, data manager 110 created and managed mapping 300 when determining which of records 230-234, 238, 242, and 248-252 have overlapping points in the manner described above. As shown, mapping 300 includes five associations 312-320. Associations 314-320 have only one point associated with a coordinate. Association 312 has four points associated with coordinates (37, −121). Thus, mapping 300 shows that four of the records (records 230, 234, 248, and 250 in this example) have points that are overlapping while the four other records (records 232, 238, 242, and 252 in this example) have points that do not overlap with any other points.

Returning to FIG. 1 and continuing with the example, data manager 110 sends visualization manager 115 the map extent, records 230-234, 238, 242, and 248-252, and the determined overlapping points (mapping 300 in this example). Once visualization manager 115 receives map extent, records 230-234, 238, 242, and 248-252, and the determined overlapping points, visualization manager 115 renders a view of a map defined by the map extent. In this example, visualization manager 115 renders the view of a map defined by retrieving map data (e.g., raster tiles, vector base maps, etc.) for the view of the map defined by the map extent from another computing system (e.g., a third party system that provides map data) and rendering the view of the map based on the map data. Next, visualization manager 115 determines whether there are any records that have overlapping points (e.g., by examining mapping 300). In this example, visualization manager 115 determines that coordinates (37, −121) has four overlapping points. Thus, visualization manager 115 renders a geometry in the view of the map that represents these four overlapping points. The location of the geometry is the coordinates shared by the overlapping points. In addition, visualization manager 115 renders an indication in the view of the map near or adjacent to the geometry. The indication indicates that the geometry represents four overlapping points. Then, for records with points that are not overlapping, visualization manager 115 renders a geometry for each point at the location specified by the coordinates associated with the point. After rendering is complete, visualization manager 115 provides the view of the map (e.g., on a display of client device 105) for viewing.

In some embodiments, visualization manager 115 renders the size of geometries based on non-location data. In this example, visualization manager 115 renders the size of geometries based on the expense values in field 220. Specifically, visualization manager 115 renders the size of the geometry that represents these four overlapping points by calculating an average value of the expense values associated with overlapping points (records 230, 234, 248, and 250 in this example) and rendering the size of the geometry based on the average value. For records with points that are not overlapping, visualization manager 115 determines a size for each of these geometries based on the expense value associated with the point.

In some embodiments, visualization manager 115 renders the color of geometries based on non-location data. For this example, visualization manager 115 uses two threshold values (which can be specified by the user of client device 105) and expense values in field 220 to determine a color for a geometry. The first threshold value is 5 k and the second threshold value is 10 k. In addition, an expense value less than or equal to the first threshold value is assigned a red color, an expense value greater than the first threshold value and less than or equal to the second threshold value is assigned an orange color, and an expense value greater than the second threshold value is assigned a green color. Based on these threshold values, visualization manager 115 assigns the color for record 230 as green, the color for record 232 as orange, the color for record 234 as green, the color for record 238 as red, the color for record 242 as orange, the color for record 248 as green, the color for record 250 as orange, and the color for record 252 as green. Visualization manager 115 renders the size of the geometry that represents these four overlapping points by calculating an average color value of the color values associated with overlapping points (records 230, 234, 248, and 250 in this example) and rendering the color of the geometry based on the average color value. For records with points that are not overlapping, visualization manager 115 determines the color value for each of these geometries based on the color value associated with the point.

Figure 4:
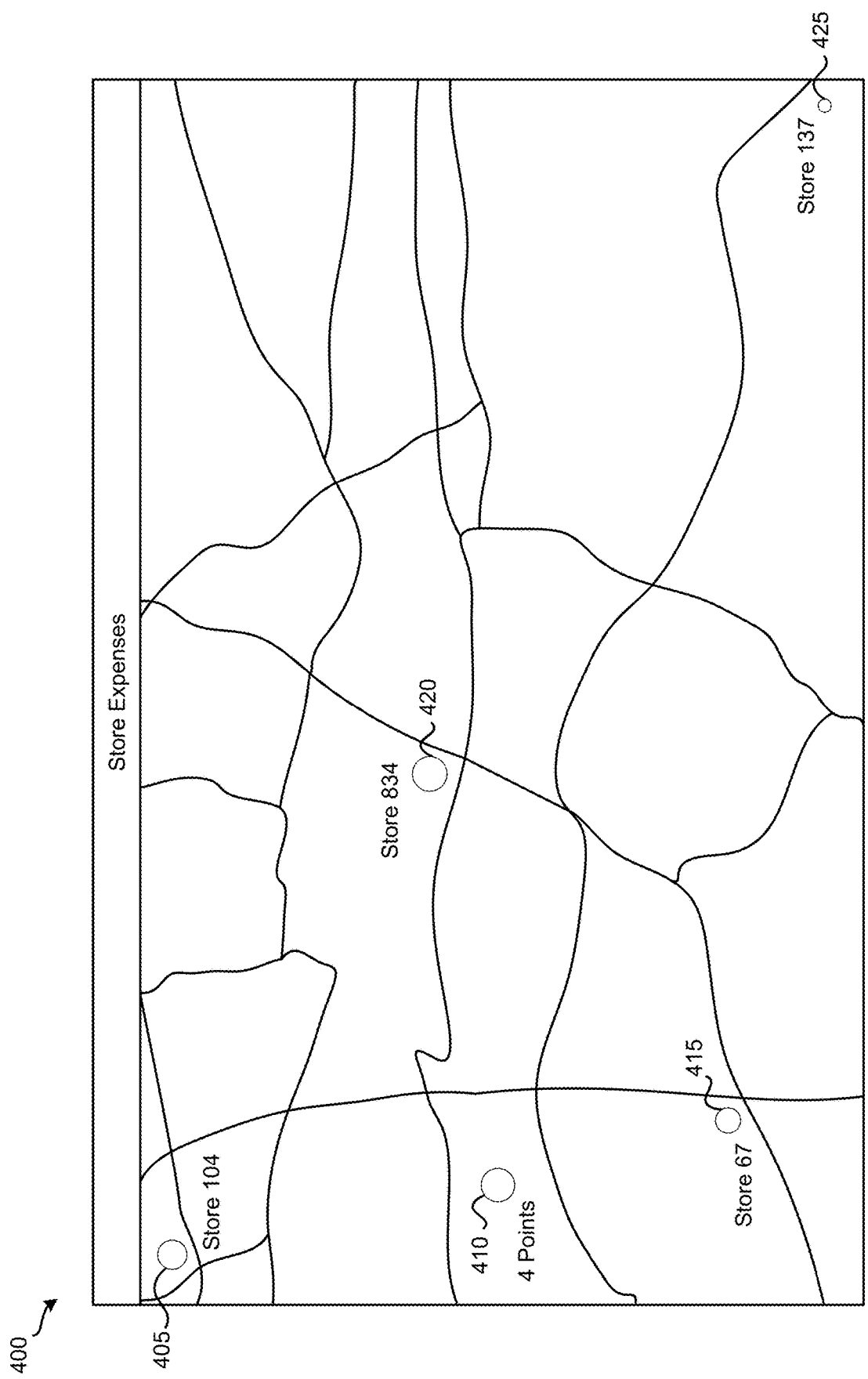
FIG. 4 illustrates an example view of a map rendered with data in the table illustrated in FIG. 2 according to some embodiments.

FIG. 4 illustrates an example view of a map 400 rendered with data in table 200 illustrated in FIG. 2 according to some embodiments. As illustrated, the view of the map 400 includes geometries 405-425. In this example, geometries 405-425 are circles. Geometry 405 represents record 242 and is rendered with an orange color (not shown). Geometry 410 represents the four overlapping points (records 230, 234, 248, and 250 in this example) and is rendered with a color (not shown) that is the average of colors assigned to the overlapping points (i.e., the average color of three green colors and an orange color). Geometry 415 represents record 232 and is rendered with an orange color (not shown). Geometry 420 represents record 252 and is rendered with a green color (not shown). Geometry 425 represents record 238 and is rendered with a red color (not shown). In addition, the size of geometries 405 and 415-425 are based on the expense values associated with the respective records. The size of geometry 410 is based on the average of the expense values associated with overlapping points.

Referring back to FIG. 1 and continuing with the example, the user of client device 105 selects geometry 410 (e.g., using a cursor and left-clicking a pointing device connected to client device 105, touching geometry 410 through a touchscreen of client device 105, etc.) to view data associated with the individual points in the overlapping points. In response, visualization manager 115 generates and provides a user interface (UI) control that includes a selectable UI element for each point in the overlapping points represented by geometry 410. Each selectable UI element provides data associated with the respective point.

Figure 5:
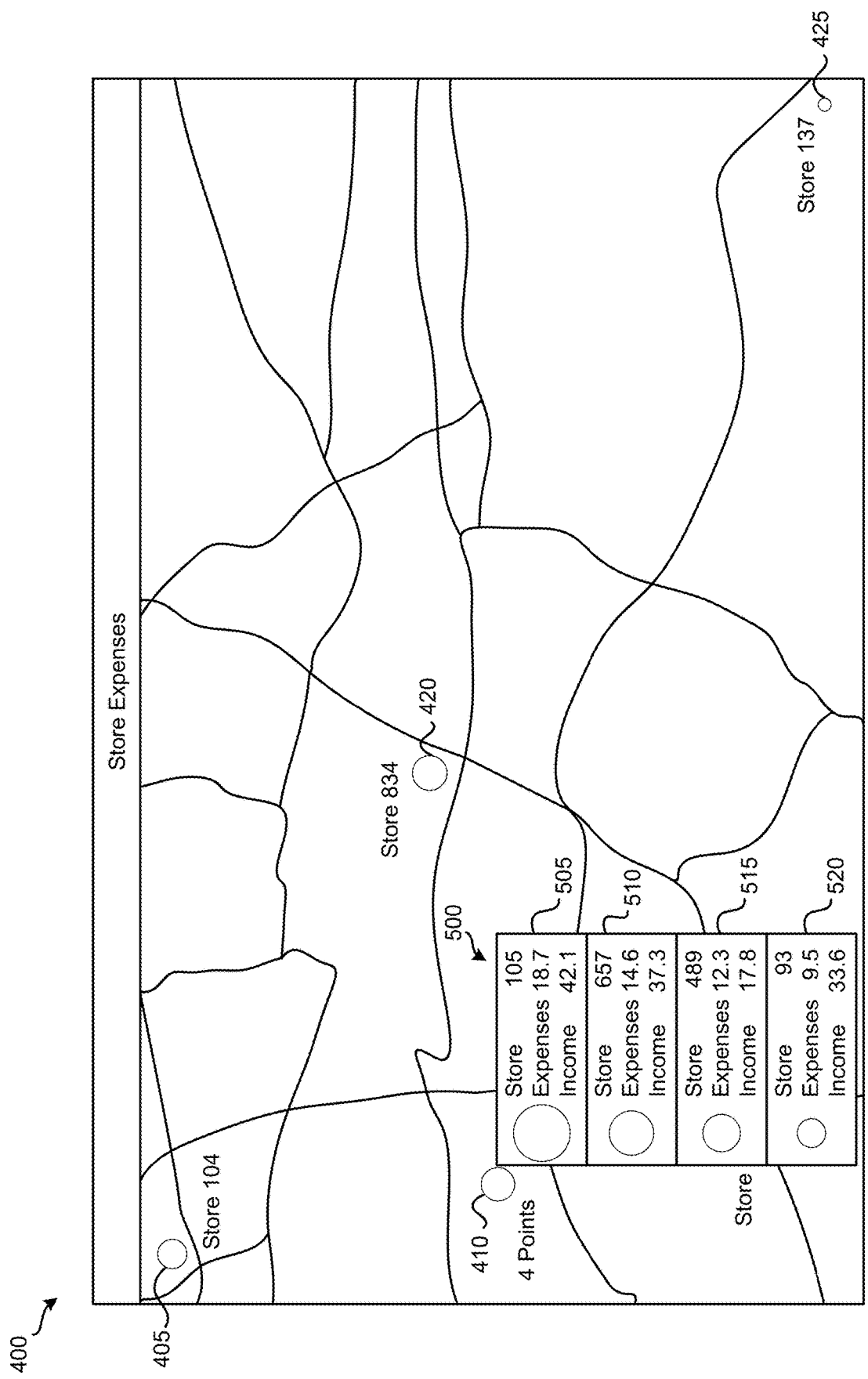
FIG. 5 illustrates a user interface control for displaying data associated with the overlapping points illustrated in FIG. 4 according to some embodiments.

FIG. 5 illustrates a user interface control 500 for displaying data associated with the overlapping points illustrated in FIG. 4 according to some embodiments. As shown, FIG. 5 includes the view of the map 400 and UI control 500. Visualization manager 115 generates and provides UI control 500 (e.g., by overlaying UI control 500 on top of the view of the map 400) in response to a selection of geometry 410. As illustrated, UI control 500 includes selectable UI elements 505-525. UI element 505 represents record 230, UI element 510 represents record 234, UI element 515 represents record 248, and UI element 525 represents record 250. Each of the elements 505-525 includes the respective store ID, expense value, and income value shown in table 200. In addition, each of the elements 505-525 includes a geometry rendered with a size and a color (not shown) based on the expense value associated with the respective record.

Returning to FIG. 1 and continuing with the example, the user of client device 105 selects (e.g., using a cursor and left-clicking a pointing device connected to client device 105, touching geometry 410 through a touchscreen of client device 105, etc.) one of the UI elements in the UI control mentioned above and selects an option (e.g., from a drop-down menu, a context menu, etc.) to view a chart of the data associated with the selected UI element. In response to these selections, visualization manager 115 generates and provides a chart of the data associated with the selected UI element.

Figure 6:
FIG. 6 illustrates a chart of data associated with an overlapping point illustrated in FIG. 5 according to some embodiments.

FIG. 6 illustrates a chart of data associated with an overlapping point illustrated in FIG. 5 according to some embodiments. As illustrated in FIG. 6, the user of client device 105 in this example selected UI element 510, which is associated with record 234, as indicated by a grey highlighting of UI element 510. In response to the selection UI element 510 and a selection of an option (not shown) to view a chart of the data associated with UI element 510, visualization manager 115 generates and provides chart 600 (e.g., by overlaying chart 600 on top of the view of the map 400). As shown, chart 600 is a bar chart depicting the expense value and the income value associated with record 234.

The examples and embodiments described above show the size and color of geometries rendered based one particular field of data. One of ordinary skill in the art will appreciate that different attributes of the geometries can be rendered based on different fields of data in different embodiments. For instance, the size and color of the geometries may be rendered, in some embodiments, based on the income values. In some embodiments, the size of the geometries may be rendered based on the expense value while the color of the geometries may be rendered based on the income values or vice versa.

Figure 7:
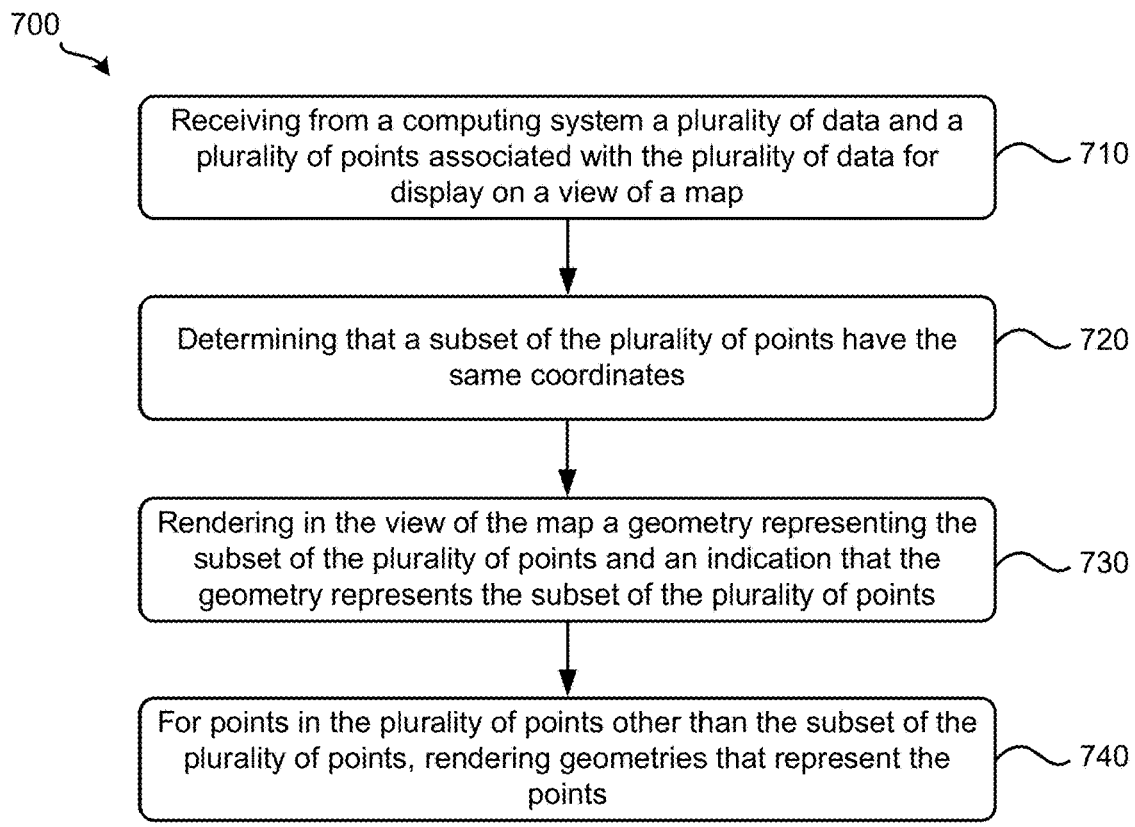
FIG. 7 illustrates a process for rendering overlapping points according to some embodiments.

FIG. 7 illustrates a process 700 for rendering overlapping points according to some embodiments. In some embodiments, client device 105 performs process 700. Process 700 starts by receiving, at 710, from a computing system a plurality of data and a plurality of points associated with the plurality of data for display on a view of a map. Each point in the set of points may include location data specifying a location of the point. Referring to FIGS. 1 and 2 as an example, data manager 110 of client device 105 can receive the plurality of data and the plurality of points associated with the plurality of data for display in a view of a map. For example, data manager 110 may receive records 230-234, 238, 242, and 248-252 when a user of client device 105 request for a view of a map showing locations of stores based on expense data of the stores where the map extent of the view of the map specifies a latitude range of 25-50 and a longitude range of (−125)-(−90).

Next, process 700 determines, at 720, that a subset of the plurality of points have the same location data. Referring to FIGS. 1 and 2 and continuing with the example above, data manager 110 can determine which of records 230-234, 238, 242, and 248-252 have overlapping points. In some embodiments, data manager 110 makes such a determination by iterating through the records and using a mapping, as explained above.

Process 700 then renders, at 730, in the view of the map a geometry representing the subset of the plurality of points and an indication that the geometry represents the subset of the plurality of points. Referring to FIGS. 1-3 and continuing with the example above, visualization manager 115 renders a view of a map defined by the map extent (e.g., by retrieving map data (e.g., raster tiles, vector base maps, etc.) for the view of the map defined by the map extent from another computing system (e.g., a third party system that provides map data) and rendering the view of the map based on the map data). Visualization manager 115 then determines whether there are any records that have overlapping points by examining mapping 300. Visualization manager 115 determines in this example that coordinates (37, −121) has four overlapping points. Therefore, visualization manager 115 renders a geometry in the view of the map that represents these four overlapping points at a location in the view of the map specified by the coordinates shared by the overlapping points. Also, visualization manager 115 renders an indication in the view of the map near or adjacent to the geometry indicating that the geometry represents four overlapping points.

Finally, for points in the plurality of points other than the subset of the plurality of points, process 700 renders, at 740, geometries that represent the points. Referring to FIGS. 1 and 4 and continuing with the example above, visualization manager 115 renders, for records with points that are not overlapping, a geometry for each point at the location specified by the coordinates associated with the point. After rendering is complete, visualization manager 115 provides the view of the map (e.g., on a display of client device 105) for viewing. FIG. 4 illustrates the view of the map 400 rendered according to this example.

Figure 8:
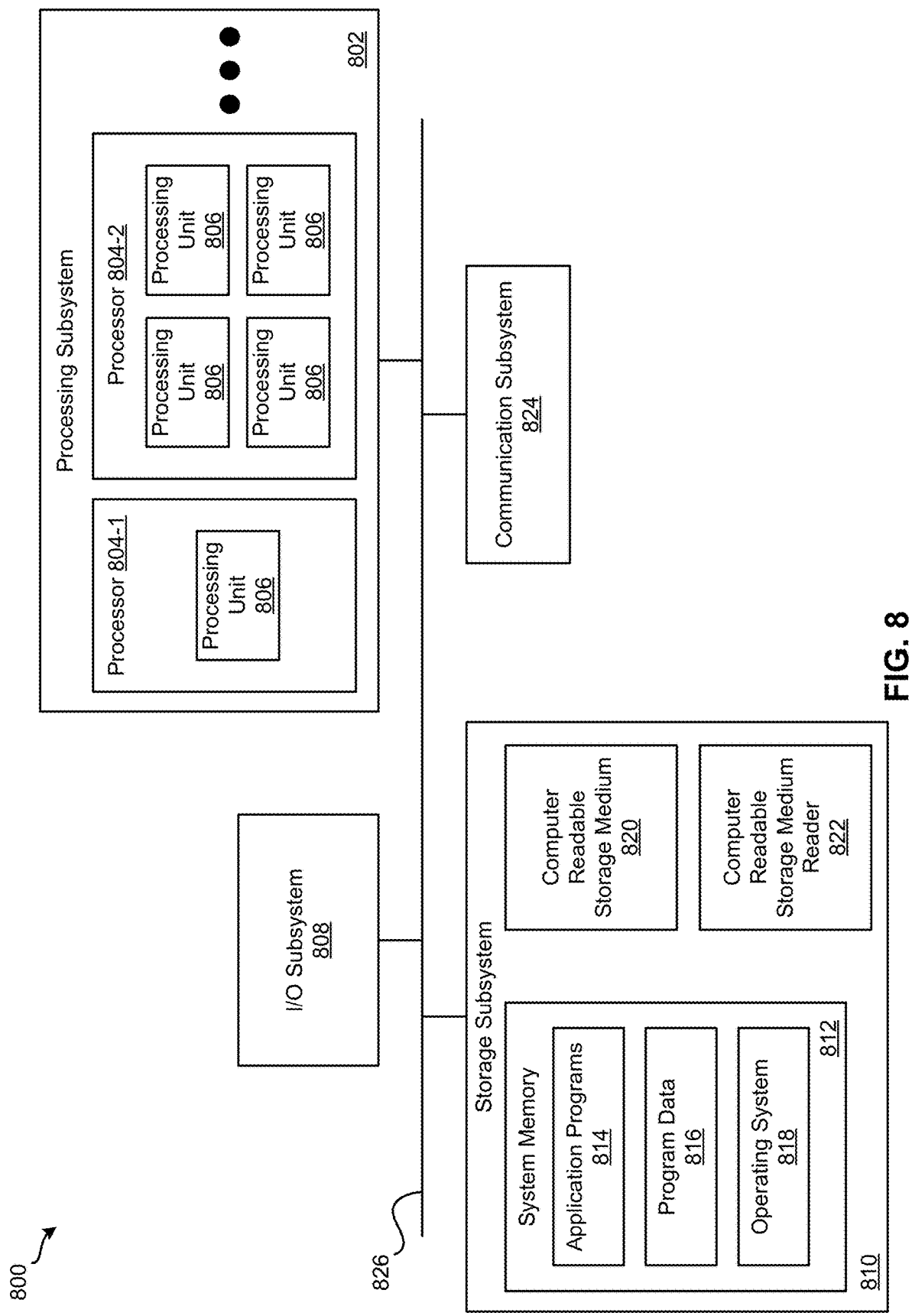
FIG. 8 illustrates an exemplary computer system, in which various embodiments may be implemented.

FIG. 8 illustrates an exemplary computer system 800 for implementing various embodiments described above. For example, computer system 800 may be used to implement client device 105 and computing system 120. Computer system 800 may be a desktop computer, a laptop, a server computer, or any other type of computer system or combination thereof. Some or all elements of data manager 110, visualization manager 115, application 125, query processor 130, or combinations thereof can be included or implemented in computer system 800. In addition, computer system 800 can implement many of the operations, methods, and/or processes described above (e.g., process 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM).

System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application 125), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., data manager 110, visualization manager 115, application 125, and query processor 130) and/or processes (e.g., process 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
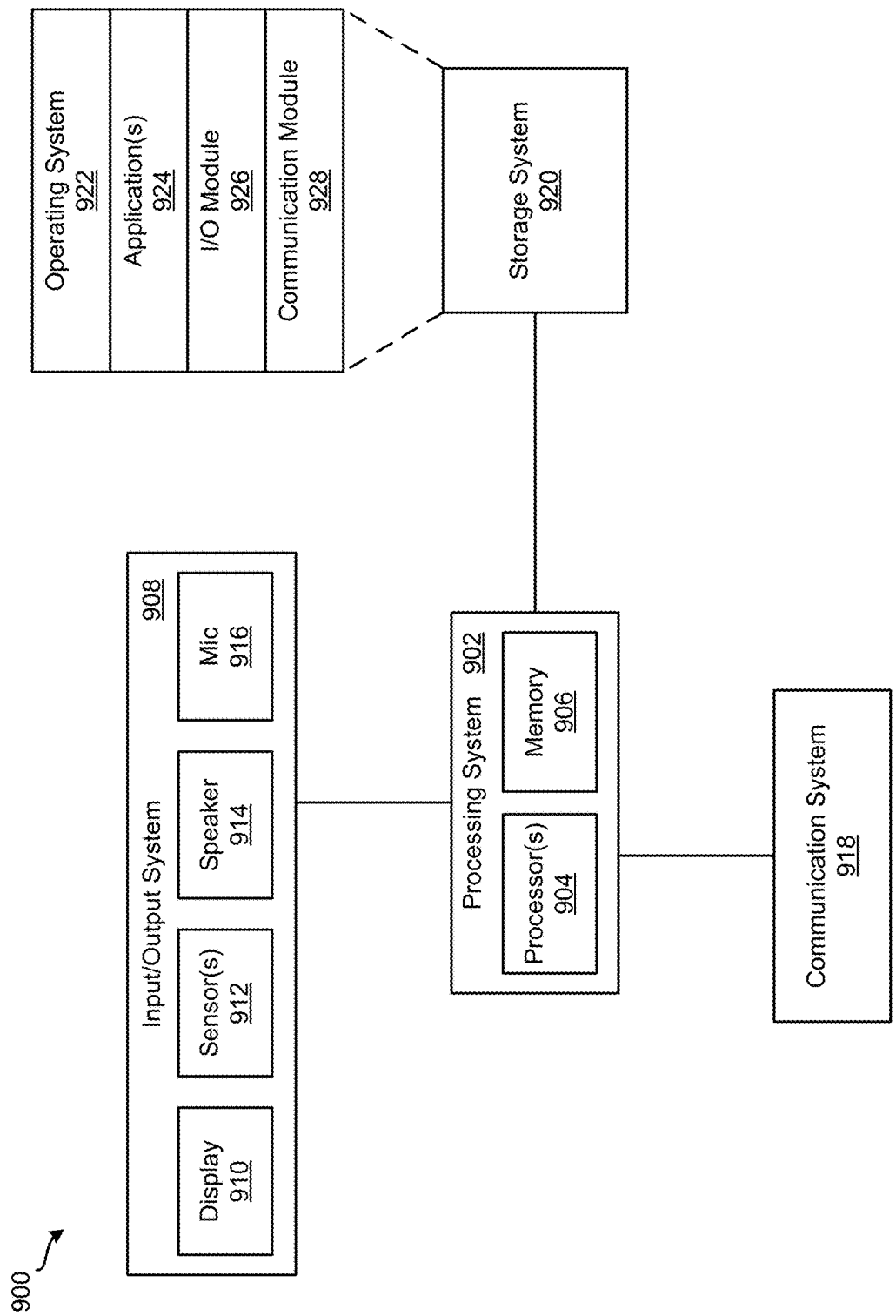
FIG. 9 illustrates an exemplary computing device, in which various embodiments may be implemented.

FIG. 9 illustrates an exemplary computing device 900 for implementing various embodiments described above. For example, computing device 900 may be used to implement client device 105. Computing device 900 may be a cellphone, a smartphone, a wearable device, an activity tracker or manager, a tablet, a personal digital assistant (PDA), a media player, or any other type of mobile computing device or combination thereof. Some or all elements of data manager 110, visualization manager 115, or combinations thereof can be included or implemented in computing device 900. In addition, computing device 900 can implement many of the operations, methods, and/or processes described above (e.g., process 700). As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software. Many of the components (e.g., data manager 110 and visualization manager 115) and/or processes (e.g., process 700) described above may be implemented as software that when executed by a processor or processing unit (e.g., processors 904 of processing system 902) performs the operations of such components and/or processes.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
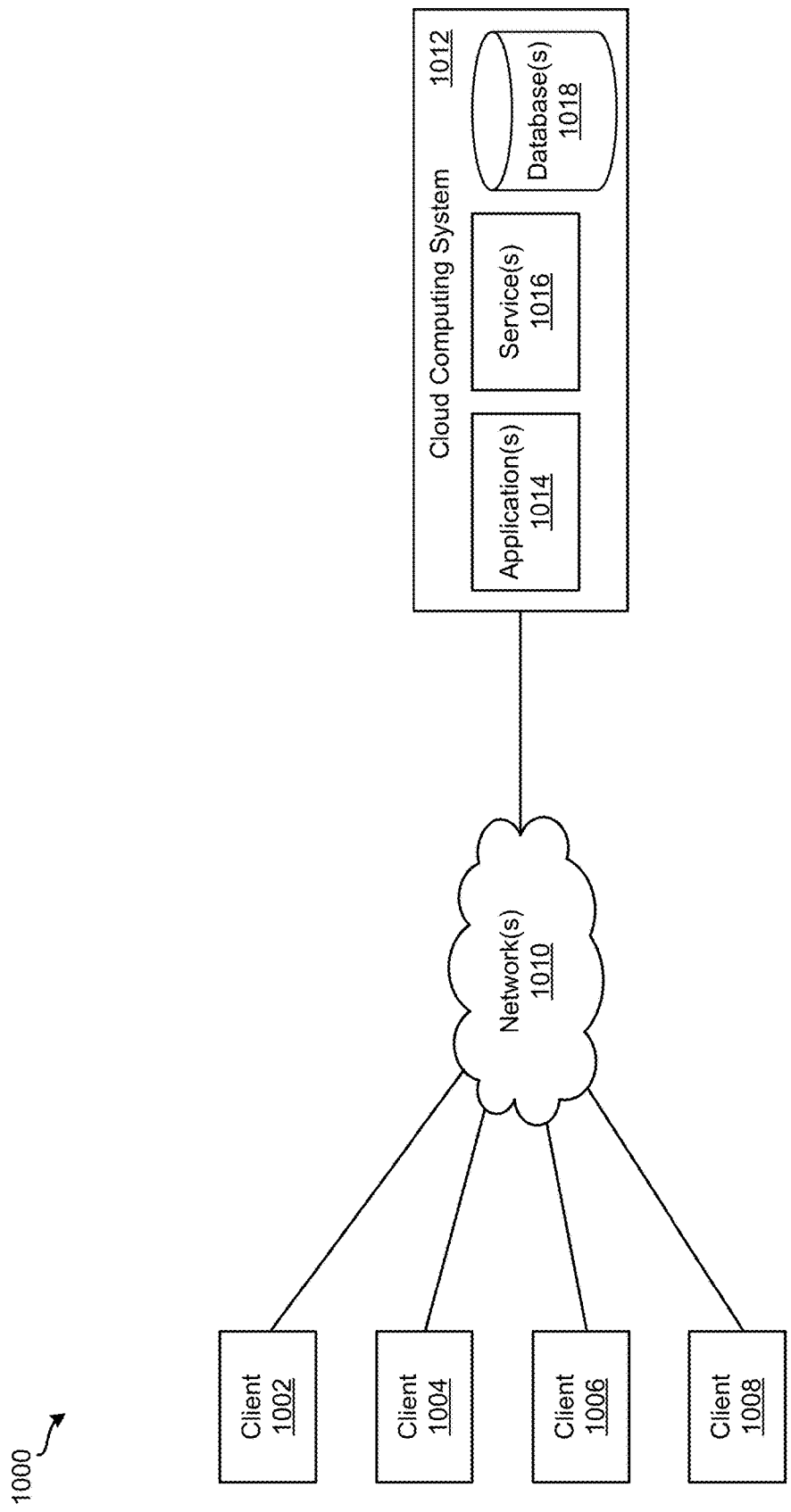
FIG. 10 illustrates system for implementing various embodiments described above.

FIG. 10 illustrates an exemplary system 1000 for implementing various embodiments described above. For example, cloud computing system 1012 of system 1000 may be used to implement computing system 120 and one of client devices 1002-1008 may be used to implement client device 105. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storage 135 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
    receiving from a computing system a plurality of data and a plurality of points associated with the plurality of data for display in a view of a map, each point in the set of points comprising location data specifying a location of the point;
    determining that a subset of the plurality of points would overlap in the view of the map based on the subset having the same location data;
    calculating an average value based on the data associated with the subset of the plurality of points;
    determining a size of a geometry representing the subset of the plurality of points based on the average value;
    rendering in the view of the map the geometry representing the subset of the plurality of points at the size based on the average value and an indication that the geometry represents the subset of the plurality of points, the indication including text specifying a number of points in the subset; and
    for points in the plurality of points other than the subset of the plurality of points, rendering geometries that represent the points.

2. The non-transitory machine-readable medium of claim 1, wherein the program further comprises a set of instructions for receiving from the computing system a plurality of point identifiers associated with the plurality of points,
    wherein determining the subset of the plurality of points comprises, for each point in the plurality of points:
    determining whether the location data of the point exists in a mapping of location data and point identifiers;
    when the location data of the point is determined to exist in the mapping, adding the point identifier to point identifiers mapped to the location data; and
    when the location data of the point is determined to exist in the mapping, adding an association between the location data and the point identifier to the mapping.

3. The non-transitory machine-readable medium of claim 1, wherein the program further comprises sets of instructions for:
    receiving a selection of the geometry representing the subset of the plurality of points; and
    in response to receiving the selection, providing a user interface control comprising a selectable UI element for each point in the subset of the plurality of points.

4. The non-transitory machine-readable medium of claim 3, wherein the program further comprises sets of instructions for:
    receiving a selection of one of the selectable UI elements in the user interface control;
    receiving a request for a visualization of the data associated with the point associated with the selected UI element; and
    in response to the request, providing the visualization of the data associated with the point associated with the selected UI element.

5. The non-transitory machine-readable medium of claim 1, wherein the program further comprises sets of instructions for:
    for points in the plurality of points other than the subset of the plurality of points, determining sizes for the geometries based on values of the data associated with the points.

6. The non-transitory machine-readable medium of claim 1, wherein the program further comprises sets of instructions for:
    determining a color value for each point in the plurality of points based on values of the data associated with the plurality of points and a set of threshold values;
    calculating an average color value based on the determined color values of the subset of the plurality of points based on the average value;
    determining a color of the geometry representing the subset of the plurality of points based on the average color value; and
    for points in the plurality of points other than the subset of the plurality of points, determining colors for the geometries based on the color values of the points.

7. The non-transitory machine-readable medium of claim 1, wherein the program further comprises sets of instructions for:
    receiving a request for view of the map;
    determining a map extent of the view of the map;
    generating a query for points with location data that fall within the map extent; and
    sending the query to the computing system,
    wherein the plurality of data and the plurality of points associated with the plurality of data received from the computing system is a response to the query.

8. A method comprising:
    receiving from a computing system a plurality of data and a plurality of points associated with the plurality of data for display in a view of a map, each point in the set of points comprising location data specifying a location of the point;
    determining that a subset of the plurality of points would overlap in the view of the map based on the subset having the same location data;
    calculating an average value based on the data associated with the subset of the plurality of points;
    determining a size of a geometry representing the subset of the plurality of points based on the average value;
    rendering in the view of the map the geometry representing the subset of the plurality of points at the size based on the average value and an indication that the geometry represents the subset of the plurality of points, the indication including text specifying a number of points in the subset; and for points in the plurality of points other than the subset of the plurality of points, rendering geometries that represent the points.

9. The method of claim 8 further comprising receiving from the computing system a plurality of point identifiers associated with the plurality of points,
wherein determining the subset of the plurality of points comprises, for each point in the plurality of points:
determining whether the location data of the point exists in a mapping of location data and point identifiers;
when the location data of the point is determined to exist in the mapping, adding the point identifier to point identifiers mapped to the location data; and
when the location data of the point is determined to exist in the mapping, adding an association between the location data and the point identifier to the mapping.

10. The method of claim 8 further comprising:
receiving a selection of the geometry representing the subset of the plurality of points; and
in response to receiving the selection, providing a user interface control comprising a selectable UI element for each point in the subset of the plurality of points.

11. The method of claim 10 further comprising:
receiving a selection of one of the selectable UI elements in the user interface control;
receiving a request for a visualization of the data associated with the point associated with the selected UI element; and
in response to the request, providing the visualization of the data associated with the point associated with the selected UI element.

12. The method of claim 8 further comprising:
for points in the plurality of points other than the subset of the plurality of points, determining sizes for the geometries based on values of the data associated with the points.

13. The method of claim 8 further comprising:
determining a color value for each point in the plurality of points based on values of the data associated with the plurality of points and a set of threshold values;
calculating an average color value based on the determined color values of the subset of the plurality of points based on the average value;
determining a color of the geometry representing the subset of the plurality of points based on the average color value; and
for points in the plurality of points other than the subset of the plurality of points, determining colors for the geometries based on the color values of the points.

14. The method of claim 8 further comprising:
receiving a request for view of the map;
determining a map extent of the view of the map;
generating a query for points with location data that fall within the map extent; and
sending the query to the computing system,
wherein the plurality of data and the plurality of points associated with the plurality of data received from the computing system is a response to the query.

15. A system comprising:
a set of processing units; and
a non-transitory machine-readable medium storing instructions that when executed by at least one processing unit in the set of processing units cause the at least one processing unit to:
receive from a computing system a plurality of data and a plurality of points associated with the plurality of data for display in a view of a map, each point in the set of points comprising location data specifying a location of the point;
determine that a subset of the plurality of points would overlap in the view of the map based on the subset having the same location data;
calculate an average value based on the data associated with the subset of the plurality of points;
determine a size of a geometry representing the subset of the plurality of points based on the average value;
render in the view of the map the geometry representing the subset of the plurality of points at the size based on the average value and an indication that the geometry represents the subset of the plurality of points, the indication including text specifying a number of points in the subset; and
for points in the plurality of points other than the subset of the plurality of points, render geometries that represent the points.

16. The system of claim 15, wherein the instructions further cause the at least one processing unit to receive from the computing system a plurality of point identifiers associated with the plurality of points,
wherein determining the subset of the plurality of points comprises, for each point in the plurality of points:
determining whether the location data of the point exists in a mapping of location data and point identifiers;
when the location data of the point is determined to exist in the mapping, adding the point identifier to point identifiers mapped to the location data; and
when the location data of the point is determined to exist in the mapping, adding an association between the location data and the point identifier to the mapping.

17. The system of claim 15, wherein the instructions further cause the at least one processing unit to:
receive a selection of the geometry representing the subset of the plurality of points; and
in response to receiving the selection, provide a user interface control comprising a selectable UI element for each point in the subset of the plurality of points.

18. The system of claim 17, wherein the instructions further cause the at least one processing unit to:
receive a selection of one of the selectable UI elements in the user interface control;
receive a request for a visualization of the data associated with the point associated with the selected UI element; and
in response to the request, provide the visualization of the data associated with the point associated with the selected UI element.

19. The system of claim 15, wherein the instructions further cause the at least one processing unit to:
for points in the plurality of points other than the subset of the plurality of points, determine sizes for the geometries based on values of the data associated with the points.

20. The system of claim 15, wherein the instructions further cause the at least one processing unit to:
determine a color value for each point in the plurality of points based on values of the data associated with the plurality of points and a set of threshold values;
calculate an average color value based on the determined color values of the subset of the plurality of points based on the average value;

determine a color of the geometry representing the subset of the plurality of points based on the average color value; and for points in the plurality of points other than the subset of the plurality of points, determine colors for the geometries based on the color values of the points.

* * * * *